3,355,285
CREEP RESISTANT SOLDER ALLOY

Douglas J. Harvey, Utica, Mich., assignor to General Motors Corporation, Detroit, Mich., a corporation of Delaware
No Drawing. Filed Oct. 21, 1965, Ser. No. 500,313
2 Claims. (Cl. 75—166)

This invention relates to copper-brass heat exchangers, such as automobile radiators and the like, and more particularly to a creep resistant lead base solder for use in such heat exchangers.

For many years automobile radiators and heater cores have been fabricated using a lead base solder. Perhaps the most common of these solder alloys consists of 70% lead and 30% tin. While this solder has sufficient strength at room temperature it is much weaker and more subject to failure at 220° F. As it has become necessary, for economic reasons, to reduce the material weight of radiator and heater core brass sections, more and more stress is placed on the soldered joints. In recent years there has been an increase in the number of failures in these solder joints. These failures are due to a stress rupture or creep rupture of the lead-tin solder alloy at the operating temperature of the radiator. Therefore, it is now necessary to find a stronger solder means of joining heat exchanger sections. Preferably a lead base composition would be selected because of the low cost of lead. However, the strength of such a solder in the range of 220° F. and particularly the creep resistance of the alloy in this temperature region must be substantially improved over the present composition.

Accordingly, it is an object of this invention to provide a high strength creep resistant lead based alloy. It is a more specific object of this invention to provide such a lead based alloy for use as a solder in automobile copper-brass radiators and heater cores at an operating temperature of about 220° F.

These and other objects are accomplished with a lead based solder comprising by weight 1 to 5% tin, 0.1 to 2% silver, 0.1 to 0.4% zinc, and the balance substantially all lead.

It is now well known that metals and alloys may fail in service even though they may never have been subjected to a stress as great as their yield strength or their elastic limit as determined by the conventional short-time tensile test. The cause of these failures may be either one or the other of two phenomena known as creep and fatigue. My invention relates to creep failure in lead based solders.

When a metal or alloy is submitted to a tensile stress for a long period of time, particularly at temperatures above room temperature, it may gradually elongate or "creep." As the stress is maintained, if the temperature is high enough, the metal may continue to deform and may eventually even fail. Of course, it follows that the rate of creep increases rapidly with temperature. Thus, while the conventional 70% lead, 30% tin solder has a room temperature tensile strength of nearly 8000 p.s.i., it has a 50 hour rupture stress of only 80 p.s.i. at 220° F. This means that rupture will occur in such an alloy in 50 hours when it is loaded to a stress of 80 p.s.i. at 220° F. It would be preferable to have available a cheap solder having a greater creep resistance at automotive radiator operating temperatures.

I have made the surprising discovery that lead based solders having a tin content of less than 5% by weight have a much greater rupture strength at 220° F. than do those solders containing substantially more tin. This is true despite the fact that the relationship beween the room temperature tensile strengths of the respective alloys is just the opposite. For example, an alloy of 70% lead and 30% tin has displayed a tensile strength of nearly 8,000 pounds per square inch at room temperature. Yet the same alloy under a load of 1,000 pounds per square inch at 220° F. will fail in a few minutes. On the other hand, a solder consisting of less than 5% tin and the balance lead has a lower tensile strength at room temperature but a substantially higher rupture strength at 220° F.

In addition to reducing the tin content of the conventional lead solder, I have found that the creep resistance may be further increased by including a small amount of silver. I have conducted numerous tests which show the desirable effect in terms of creep resistance upon the conventional lead solder of reducing tin content and adding small amounts of silver.

These tests were conducted by placing solder specimens under a constant dead weight load at a temperature of 220° F. ±1° until rupture occurred. Two types of specimens were used. The first type of specimen, characterized by an "A" in the table below, was a soldered brass assembly, and the second type of specimen "B" was an all solder stress rupture rod. Specimen A was prepared by assembling two 0.007" thick brass sheets (1" x 1¾"). Before assembly the brass parts were bent, 5⁄16" from the end, around a 0.020" radius to form an included angle of 45°. Soldering was done using a gas torch with the parts held in a fixture. The parts were joined at the bend. The amount of solder was held constant at 0.085 grams and a proprietary flux was used on all specimens. This soldered stress specimen was designed to stimulate a soldered radiator joint and was found to give the most reproducible results of the soldered specimens examined. Specimen B was simply a small all solder stress rupture bar made from cast and extruded alloy. ⅛" diameter extruded solder was mechanically reduced to 0.094" diameter in the test section and the small bars were soldered to brass strips to facilitate their attachment to the loading frame.

The specimens were subjected to a constant load at a temperature of 220° F. and the time at which rupture occurred was noted. A plot was made of load versus the logarithm of the time to rupture at constant temperature. In this way 50 hour rupture stresses were obtained for puroposes of comparison of different alloys. Typical results are summarized in the table below.

| Specimen | Pb | Percent | | | Load | Time, hours | Temperature, °F. |
| --- | --- | --- | --- | --- | --- | --- | --- |
| | | Sn | Ag | Zn | | | |
| B | Bal. | 30 | | | [1] 80 | 50 | 220 |
| B | Bal. | 30 | | | [1] 800 | 0.2 | 220 |
| A | Bal. | 30 | | | [2] 3.2 | 50 | 220 |
| A | Bal. | 20 | 0.5 | | [2] 3.2 | 50 | 220 |
| A | Bal. | 10 | 1.0 | | [2] 4.6 | 50 | 220 |
| A | Bal. | 4.0 | 2.0 | | [2] 14.1 | 50 | 220 |
| A | Bal. | 2.0 | 1.0 | | [2] 15.1 | 50 | 220 |
| A | Bal. | 1.0 | 2.0 | | [2] 7.3 | 50 | 220 |
| A | Bal. | | 2.5 | | [2] 10.1 | 50 | 220 |
| B | Bal. | 2.0 | 1.0 | 0.1 | [1] 1,080 | 50 | 220 |
| B | Bal. | 2.0 | 1.0 | 0.2 | [1] 800 | 50 | 220 |
| B | Bal. | 2.0 | 1.0 | 0.4 | [1] 840 | 50 | 220 |

[1] P.s.i.  [2] Lbs.

In the case of specimen A the cross sectional area could not be determined and the loads are simply dead weight loads. However, in the case of specimen B, the stress in pounds per square inch could be determined.

It is seen that lead solders with a tin composition in the range of 10 to 30% display very little improvement in creep resistance. However, I have found that by reducing the tin content below 5% and by including up to 2% silver in the solder, the 50 hour rupture stress at 220° F. is increased over four times that of the conventional solder. All of the alloys in the range of 1 to 5% tin and 0.1 to 2% silver display significant improvent in creep resistance over the conventional lead solder. As shown in the table above, the most desirable of these solders was the one consisting of 2% tin, 1% silver and the balance substantially all lead which had a 50 hour rupture load at 220° F. of 15.1 pounds which is over 4½ times that of the conventional solder under the same conditions.

I have further found that by incorporating small amounts of zinc, preferably 0.1% to about 0.4% by weight in the strongest of the lead-tin-silver solders mentioned above, further improvement in creep resistance is obtained. Although, additions of zinc up to at least 0.4% by weight result in this improvement, the maximum effect is obtained at about 0.1%. Thus, a lead base solder comprised of 2.0% tin, 1.0% silver and 0.1% zinc has a 50 hour rupture stress at 220° F. of 1080 pounds per square inch, 13½ times that of the 30% tin, 70% lead solder. Furthermore, my alloy is less expensive than the conventional solder because of the vastly reduced amounts of alloy metals.

A specific alloy of the composition comprising by weight 2.0% tin, 1.0% silver, 0.1% zinc, and the balance substantially all lead is particularly useful because of its outstanding creep resistance properties and because it is relatively inexpensive to prepare. However, any alloy composition in the range comprising, by weight, 1 to 5% tin, 0.1 to 2% silver, 0.1 to 0.4% zinc, and the balance substantially all lead is preferred for its creep resistant properties over known lead based alloys.

While my invention has been described in terms of certain specific examples, it is to be understood that other modifications or applications of the composition might readily be adopted by those skilled in the art and would be within the teachings of my invention. Therefore, it is to be limited only by the following claims.

I claim:
1. A high strength creep resistant lead based alloy comprising, by weight, 1% to 5% tin, 0.1% to 2% silver, 0.1% to 0.4% zinc, and the balance substantially all lead.
2. A high strength creep resistant lead based solder alloy comprising, by weight, 2% tin, 1% silver, 0.1% zinc and the balance substantially all lead.

References Cited
UNITED STATES PATENTS

| | | | |
|---|---|---|---|
| 1,186,217 | 6/1916 | Mark et al. | 75—166 |
| 1,333,237 | 3/1920 | Ayala | 75—166 |
| 2,306,667 | 12/1942 | Smith | 75—166 |
| 2,419,722 | 4/1947 | Lowe et al. | 75—166 |

CHARLES N. LOVELL, *Primary Examiner.*